US010375287B2

(12) United States Patent
Gefen et al.

(10) Patent No.: US 10,375,287 B2
(45) Date of Patent: Aug. 6, 2019

(54) OBJECT TRAIL-BASED ANALYSIS AND CONTROL OF VIDEO

(75) Inventors: Smadar Gefen, Yardley, PA (US); Gregory House, Doylestown, PA (US); Yuecheng Zhang, Princeton, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 1148 days.

(21) Appl. No.: 12/907,607

(22) Filed: Oct. 19, 2010

(65) Prior Publication Data

US 2011/0090344 A1 Apr. 21, 2011

Related U.S. Application Data

(60) Provisional application No. 61/253,780, filed on Oct. 21, 2009, provisional application No. 61/285,720, filed on Dec. 11, 2009.

(51) Int. Cl.
| | |
|---|---|
| *H04N 5/225* | (2006.01) |
| *G06K 9/00* | (2006.01) |
| *H04N 5/232* | (2006.01) |
| *G06T 7/246* | (2017.01) |
| *G06K 9/32* | (2006.01) |

(52) U.S. Cl.
CPC ............ *H04N 5/232* (2013.01); *G06T 7/248* (2017.01); *G06K 9/00724* (2013.01); *G06K 2009/3291* (2013.01); *G06T 2207/10016* (2013.01); *G06T 2207/10021* (2013.01); *G06T 2207/10024* (2013.01); *G06T 2207/30221* (2013.01); *G06T 2207/30224* (2013.01); *G06T 2207/30228* (2013.01); *G06T 2207/30241* (2013.01)

(58) Field of Classification Search
CPC ...... H04N 5/225; H04N 5/232; G01S 3/7864; G01S 3/7865; G06T 7/2033; G06T 2207/10016
USPC ................. 348/169, 42; 382/103, 107, 224; 396/104; 713/176
See application file for complete search history.

(56) References Cited

U.S. PATENT DOCUMENTS

| | | | | |
|---|---|---|---|---|
| 5,808,695 A | * | 9/1998 | Rosser ................... | G06T 7/204 348/135 |
| 2002/0030741 A1 | * | 3/2002 | Broemmelsiek ...... | G01S 3/7864 348/169 |
| 2004/0158719 A1 | * | 8/2004 | Lee et al. ..................... | 713/176 |

(Continued)

*Primary Examiner* — Kenneth Parker
*Assistant Examiner* — Long H Le
(74) *Attorney, Agent, or Firm* — Fay Kaplun Marcin, LLP

(57) ABSTRACT

Systems and methods for analyzing scenes from cameras imaging an event, such as a sporting event broadcast, are provided. Systems and methods include detecting and tracking patterns and trails. This may be performed with intra-frame processing and without knowledge of camera parameters. A system for analyzing a scene may include an object characterizer, a foreground detector, an object tracker, a trail updater, and a video annotator. Systems and methods may provide information regarding centers and spans of activity based on object locations and trails, which may be used to control camera field of views such as a camera pose and zoom level. A magnification may be determined for images in a video sequence based on the size of an object in the images. Measurements may be determined from object trails in a video sequence based on an effective magnification of images in the video sequence.

38 Claims, 10 Drawing Sheets

(56) References Cited

U.S. PATENT DOCUMENTS

| | | | |
|---|---|---|---|
| 2007/0279494 A1* | 12/2007 | Aman | G01S 3/7864 |
| | | | 348/169 |
| 2008/0219509 A1* | 9/2008 | White et al. | 382/107 |
| 2009/0016708 A1* | 1/2009 | Takeuchi | 396/104 |
| 2009/0028439 A1* | 1/2009 | Elangovan | G06K 9/6202 |
| | | | 382/209 |
| 2009/0041298 A1* | 2/2009 | Sandler et al. | 382/103 |
| 2009/0059007 A1* | 3/2009 | Wagg | G06K 9/00369 |
| | | | 348/157 |
| 2009/0060352 A1* | 3/2009 | Distante | A63B 24/0021 |
| | | | 382/224 |
| 2009/0315978 A1* | 12/2009 | Wurmlin et al. | 348/43 |
| 2010/0157064 A1* | 6/2010 | Cheng et al. | 348/169 |
| 2011/0081043 A1* | 4/2011 | Sabol | G06T 7/254 |
| | | | 382/103 |

\* cited by examiner

OBJECT TRAIL-BASED ANALYSIS AND CONTROL OF VIDEO

CROSS REFERENCE TO RELATED APPLICATIONS

This application claims the benefit of U.S. Provisional Appl. No. 61/263,780, filed Oct. 21, 2009, and U.S. Provisional Appl. No. 61/285,720, filed Dec. 11, 2009, which are hereby incorporated by reference in their entirety.

TECHNICAL FIELD

Embodiments of this invention are directed to object tracking, video and the field of augmented reality.

BACKGROUND

Automatic tracking of objects from one or more cameras is a prominent area within the field of computer vision. Typically, it involves calibrating the camera, modeling the scene background, detecting the foreground regions, and employing a known tracking algorithm to derive the instantaneous location of objects within the field of view of the camera. Tracking systems are widely employed for applications such as defense and civil surveillance, traffic control, and game enhancement. In the case of game enhancement, player tracking systems in a sporting event can provide game statistics that may be presented to viewers, coaches, or players during a live broadcast or later for offline analysis and storage. Another use for player tracking from a video of a sporting event is annotation—the location of players may be highlighted and their maneuvers on the court or field may be trailed. Throughout this disclosure "court" will be used to encompass a court such as a basketball court, a field such as a football field, a rink such as a hockey rink, or any other defined area on which a sport may be played.

Tracking of objects or image patterns is generally achieved through an analysis of their corresponding image-regions in each video frame. Based on a metric measured between an object's model and the image-regions' (foregrounds') descriptors, the most likely current location of the object is estimated in image-space coordinates. To derive the real-world location of a tracked object, the camera's parameters (model) should be given. A camera's model may be generally obtained through a calibration process carried out before the event, and in the case of a non-stationary camera (the broadcast camera, for example) this model should be updated for each frame as the camera's point of view varies.

Computing the camera model may require prior knowledge of the scene (such as a 3D model of the game court). The 3D model of the scene is then aligned with the current image frame to allow for the computation of the camera's parameters. This alignment may be done using a search algorithm that recognizes the image projections of features from the real-world scene (such as junction/corner points, lines, and conics). Then, an alignment (registration) method may be employed to find the mathematical transformation (homography) that maps these features from their known 3D locations in the scene to their corresponding image projections in the video frame. In the case where the camera's pose changes, the features' locations in the image frames may be tracked through time to allow update of the homography. Known in the art methods derive the camera's parameters (e.g. focal distance, tilt, pan, and orientation) from a given homography. There are two drawbacks to this approach: 1) prior knowledge of the scene is required, and 2) strong and distinctive features need to be present in the field of view to obtain reliable feature recognition. Furthermore, features should come from a plane so that a homography can be computed for the case of a moving camera.

Another alternative to the vision-based camera calibration is using an instrumented camera, where various sensors read the current camera's position, tilt, and orientation. For example, handset devices equipped with a satellite positioning (GPS) capabilities, a tilt sensor, and a digital compass, may employ augmented reality to video taken by their embedded camera and may insert time- and location-sensitive information using fast connectivity to the internet. Such technology is limited by the accuracy of today's GPS units and the quality of the video camera.

BRIEF DESCRIPTION OF DRAWINGS

Embodiments of the invention are described with reference to the accompanying drawings. In the drawings, like reference numbers may indicate identical or functionally similar elements. The drawing in which an element first appears may be indicated by the left-most digit in the corresponding reference number.

DETAILED DESCRIPTION

Figure 1:
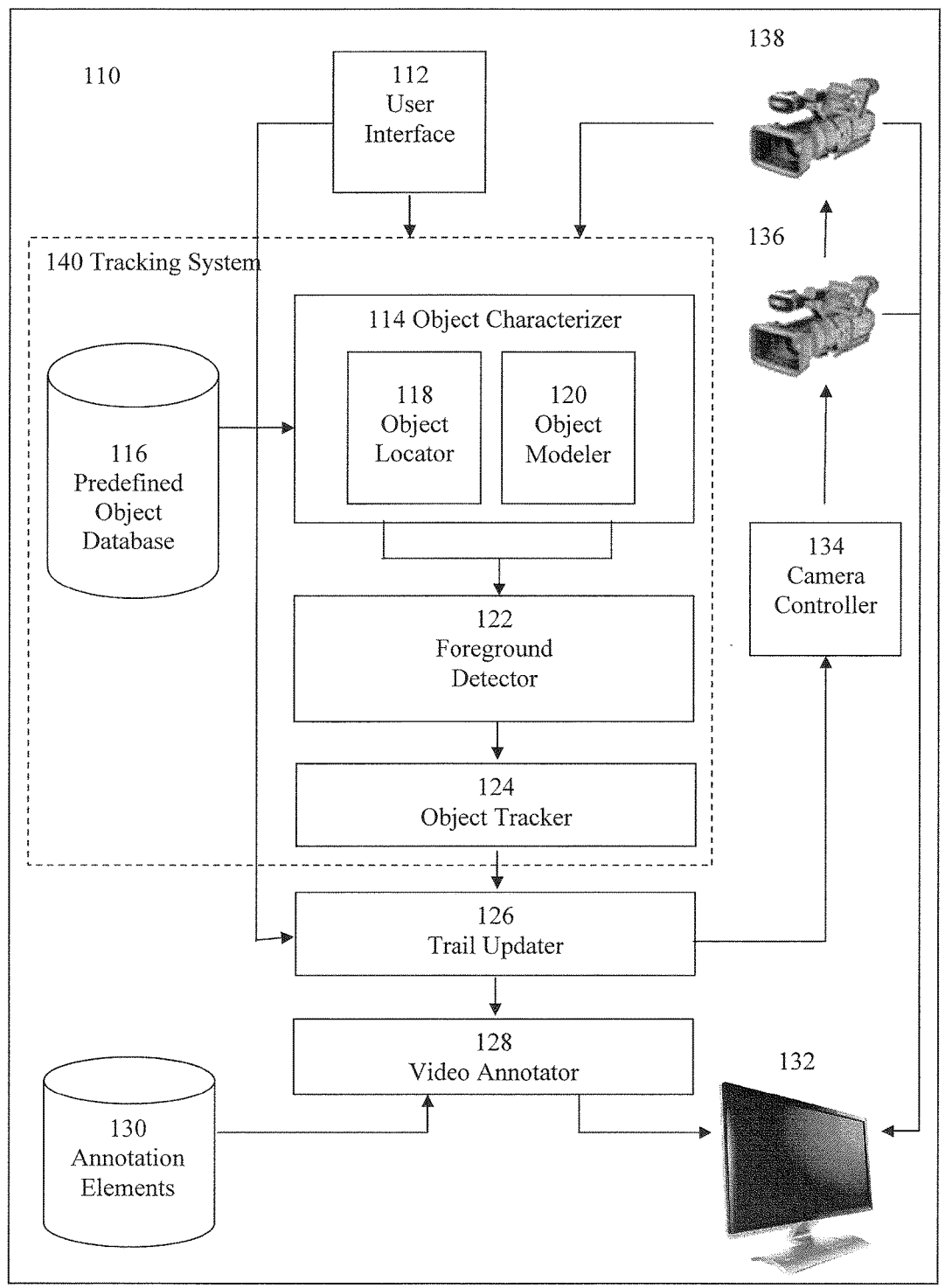
FIG. 1 shows an exemplary system for object tracking and annotation, according to an embodiment.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Systems and methods for analyzing a scene from a moveable or moving camera of an event, such as a sporting event broadcast, are provided. For example, a system for analyzing a scene from a movable camera may include detecting patterns in image space and characterizing them by, for instance, their texture, shape, or color features. These features may be represented by a descriptor. A corresponding metric is used to measure the distance (or similarity) between two patterns' descriptors, thereby determining the relation between the two patterns. For example, this could be a correlation metric (measures similarity between two regions' texture) or a mutual information metric (measures the statistical dependency between data extracted from two regions). The descriptor and metric are used together to carry out object detection and tracking.

In another example, a method for analyzing a scene from a movable camera may include annotating objects and their maneuvers in the field of view of a possibly moving camera. At each image frame the location of the object being tracked is given and its trail on the court is updated to compensate for the camera's motion. Static and dynamic regions of the scene may be tracked without the need to establish marker correspondence. In such a case, all processing may be done in image-space and without the need for prior knowledge of the scene or the camera's parameters. A markerless and 2D-based approach for video and object tracking will be advantageous for employing augmented reality in a variety of platforms.

According to some embodiments, a trail of an object may be a plurality of 2D positions with respect to the field of view of a camera at a given instance in time. The plurality of 2D positions may be derived from a video sequence of the camera's images. The plurality of 2D positions may be pixel positions relative to a given image captured from the camera or the corresponding pixel's location on the sensor used to capture the given camera image. The plurality of 2D positions may use 2D angular view point representation such as employed in U.S. patent application Ser. No. 12/507,708, which is incorporated by reference. The plurality of 2D positions may be 2D positions on a virtual surface such as a plane or a sphere in the scene at an arbitrary distance from the camera. The virtual surface may be perpendicular to the optical axis of the camera. The virtual surface may be orientated at an angle relative to the optical axis of the observation camera. One or more of the plurality of 2D positions may be outside the field of view of the observation camera, as the field of view of the camera may change over time for a particular video sequence. A plurality of reference positions may be the trail of a reference object. The plurality of reference positions may be a plurality of 2D positions of the reference object with respect to the field of view of a camera at a given instance in time.

A trail on an object may be updated by translating the trail between representations of 2D positions. For example, a trail of a plurality of 2D positions corresponding to the camera field of view at one instant in time may be translated to a trail of a plurality of 2D positions corresponding to the camera field of view at another instant in time. Also, the trail may be updated by translating a plurality of 2D positions in angular coordinates or surface coordinates to image space positions corresponding to the field of view of a camera at a particular instance in time. Additional 2D coordinate translations are possible.

According to a further embodiment, a system may be initialized to track a pattern (object) either manually or automatically. In a manual mode, a user may select an object in the video. In turn, this object may be modeled using information extracted from the video at the vicinity of the initial position manually selected by the user. Alternatively, in an automatic mode, a system may automatically detect the initial position of an object based on its pre-defined model (characteristics) stored in a database of objects of interest (such as a player, a ball, a basketball board, a logo, etc.). In either modes, having the object model and the initial position of an object, the system may compute successive positions and the trail of the tracked object in image-space.

In some cases, patterns that are rigid—including logos, hockey-sticks, the board and the ring in a basketball game, etc.—may be characterized by shape and color features. Whereas, for example, a player whose pose changes consistently may be characterized primarily based on spatial color features (possibly, in combination with an articulated model of human pose). For the latter, foreground detection (segmentation) can be instrumental in preventing contamination of the players' color model. Generally, a background-subtraction method in combination with a reference-image may be used to outline the foreground objects. Note that when a non-static camera is used, the reference-image should be updated continuously.

Another embodiment may include an intra-frame foreground detection method that is employed locally within each object's neighborhood. This foreground detection method may consider only the image pixels that come from an object's image in the current frame (intra-frame analysis), and thereby may simplify and improve the tracking of non-rigid objects captured by a non-static camera. A stereoscopic camera may further improve the analysis by generating a depth map from a stereoscopic view of the scene. This may improve the object's foreground extraction, especially when it is occluded by other objects.

A player's position points on the game floor—a player's trail—may be used to annotate an interesting maneuver of the player during the game. In a further example, the trails of two players may be annotated similarly to how telestrating appears in some game broadcasts. However, when the camera moves, the trail's location in image-space should be updated to compensate for the camera's motion. According to another embodiment, a method may include updating an object's trail based on the tracking of at least two reference stationary (or temporary stationary) patterns. This method does not require computing the camera model or recovering successive frames' homography. Moreover, this method is advantageous since it does not require finding correspondence between feature points (such as corners, junctions, etc.), a process that is frequently susceptible to noise and image impurities.

Positional and trail information of objects from the scene may be used to automatically control or guide a movable or steerable camera, according to an embodiment. A center of activity may be derived from knowledge of positions of objects or players. In addition, object trails may suggest the preferred level of zoom-in. Thus, a camera may be automatically controlled to increase its field of view to allow for optimal annotation of objects movement, such as players' maneuvers on a court.

An exemplary application may be for viewer-driven video enhancement. Telestrator functionality can be moved from the stadium or the studio to the end user at home or at any other distribution center. Thus, annotation of a selected player may be done at the broadcast video (using the set-top box technology for example), selecting a player, and having video annotation relative to the selected player's trail. Similarly, a viewer may choose to annotate a player's trail and share it with other viewers.

A system for object tracking and annotation 110 is shown in FIG. 1, according to an embodiment. The system platform may be a computing device such as a standalone computer at the stadium, at the studio, or at home embedded in the set-top box. Mobile devices may also be used. A computing device can be any type of computing device having one or more processors. 2D/3D cameras 136 and 138, either fixed or handheld, covering or imaging a sporting event, for example, provide a video feed to a tracking system 140, which may include: an object characterizer 114, a foreground detector 122, and an object tracker 124. Positional data generated by the tracking system 140 feeds a trail updater 126, that in turn, provides tracked objects' positional and progression information to, a video annotator 128 and a camera controller 134. The camera controller 134 may steer the primary camera 138 and secondary cameras 136 to cover different views of the event. For example, more than one center of activity, each with a different spatial span, may take place in an event, in which case each secondary camera may be directed to each center of activity User interface 112 may be used by a camera operator, a broadcaster, or a viewer to instruct the system to track a pre-defined object. In one case, the system then retrieves this pre-defined object's model from a database 116 and then, based on this object's model, the system locates the object with object locator 118 in the video sequence and initiates its tracking employing steps 122 and 124. Alternatively, the user may select from the video an object of interest 112 and the system will model it in real-time using object modeler 120. Once initial location and modeling of an object are received, tracking may be carried out through succeeding frames employing foreground detector 122 and object tracker 124. Hence, tracking system 140 may track one or more objects and provide the instantaneous location of objects in the field of view of successive video frames.

The information of the positions of objects through time may be used to foam a trail for each object using a trail updater 126. The trail of an object consists of points in image-space or in an alternate 2D representation, indicating the object progression in the scene. In the case where the camera moves, these trail points could be recalculated for each new pose of the camera, as will be explained in detail below. The knowledge of the objects' positions and their trails may be used to control the camera 138 using a camera controller 134. Thus, the span of trails may be used to steer the camera and control the camera's zoom level so that the action of interest will be included in the camera's field of view and be displayed on a display 132 to allow for proper annotation. Alternatively, this system may be used to guide a second camera (or more cameras) 136 that may be focusing on any object of interest in the scene (imaging only part of the field of view of the first camera or imaging a second center of activity).

Video annotation may be performed relative to location and trail information of objects using video annotator 128. Annotation can be initiated automatically. Annotation may also be initialized and/or monitored by a user using a user interface 112. Annotations may be composed by annotation elements 130 including text, graphics, images, animation, video, or a combination thereof.

According to an embodiment, object modeler 120 characterizes an object of interest (an operation termed modeling). Typically, object modeling is based on features that are extracted from the image projection of the object at the tracking initialization stage. For instance, an object may be modeled by the shape, texture, and color features that may be derived from pixel data within the object's image projection.

Next, an object's model and its initial location may be used to facilitate tracking through successive video frames. The object's model may be compared with foreground regions in the vicinity of the objects' current location. A foreground region may consist of image pixels that belong to objects in the scene such as humans, a ball, logos, etc. Foreground detection includes the separation (extraction) of pixels that belong to one of these objects from the surrounding background pixels. Accurate foreground extraction, especially when tracking a non-rigid articulated object, such as a human, directly contributes to the robustness of the tracking algorithm.

Hence, foreground detector 122 processes the image in the object's neighborhood, such as the region immediately around the object, and at the current frame only (intra-frame). In contrast to previous methods, this method overcomes the complexity of background-subtraction based methods that stem from changing lighting conditions and from camera motion. Once a foreground region is detected, characteristic features are derived from pixels belonging to this region. Characterizing features such as texture, shape, and color may be represented by a foreground descriptor. This foreground descriptor may be compared with the tracked object's model to determine the most likely new position of the object.

Figure 2:
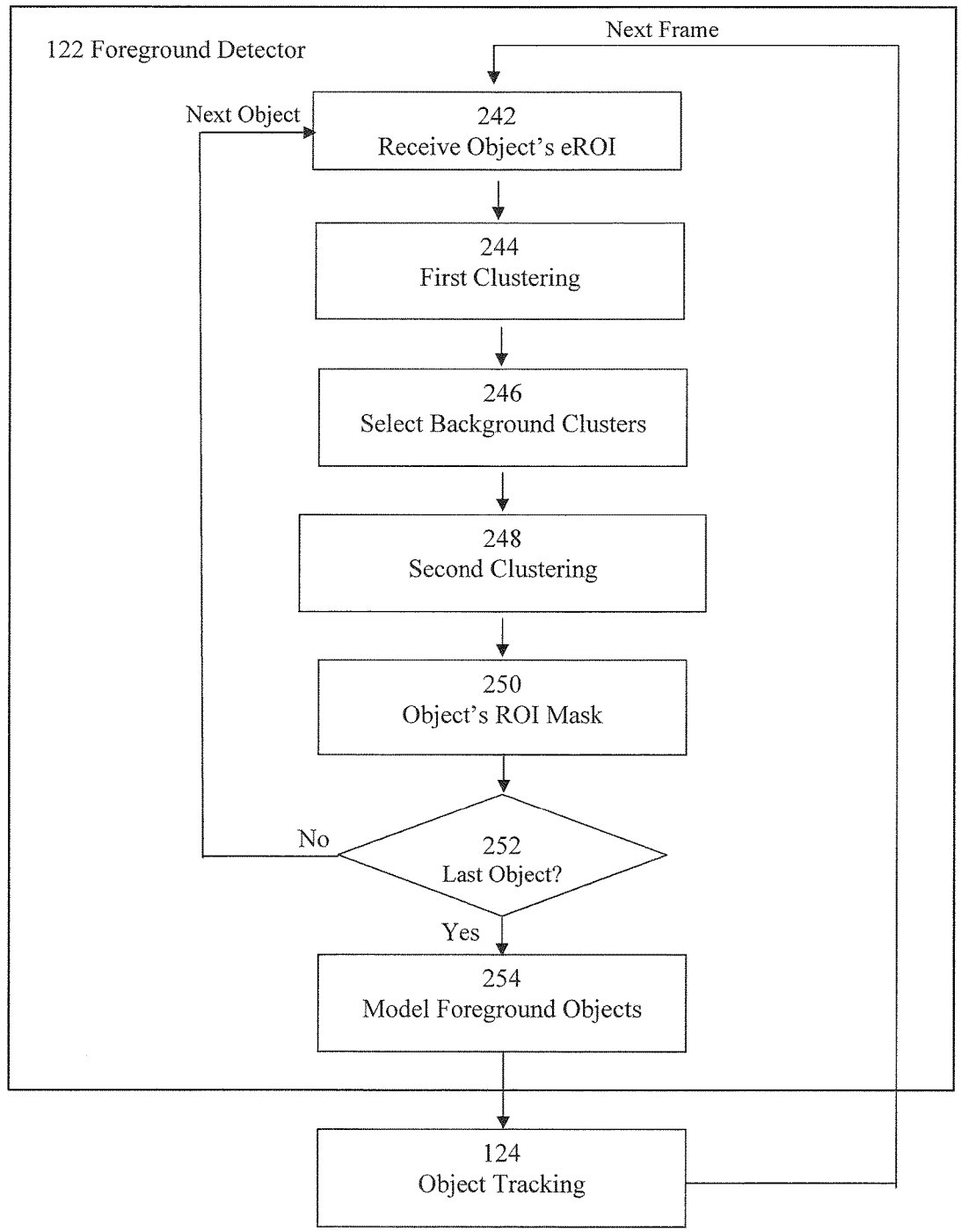
FIG. 2 shows a flowchart of a foreground detection method, according to an embodiment.
Figure 3:
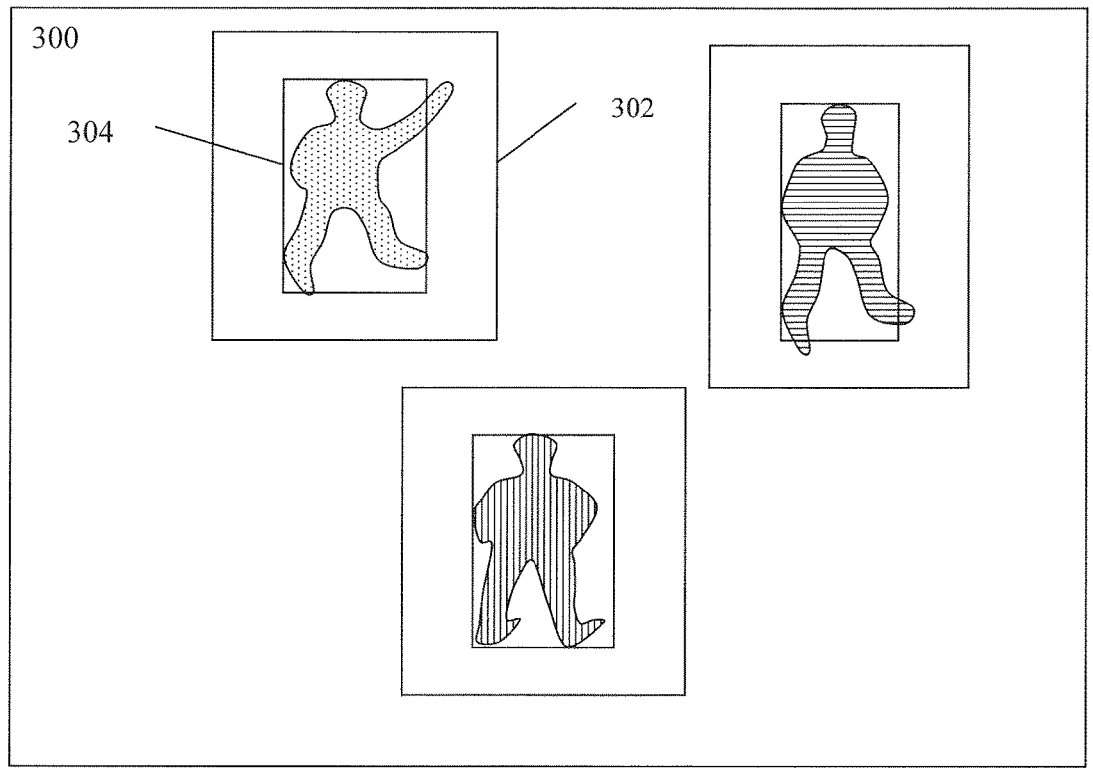
FIG. 3 illustrates a foreground detection diagram, according to an embodiment.
Figure 3:
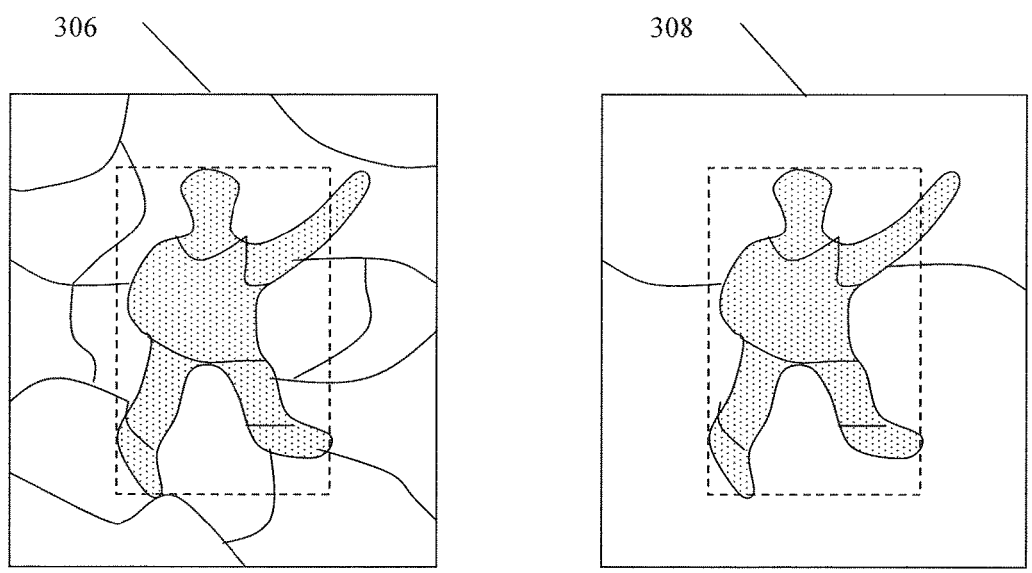

FIG. 2 shows a flowchart of operations performed by foreground detector 122 preceding the operations of object tracker 124 in tracking system 140, according to an embodiment. For each frame, the Region of Interest (ROI) of each currently tracked object is received in step 242. An extended ROI is formed, referred to here as eROI diagram 302, as shown in the example diagrams in FIG. 3 (eROI extends outward relative to the object's ROI, where an object's ROI is a tight fit over the object's outline as shown in diagram 304). First, the object's eROI may be partitioned into clusters in step 244 with approximately uniform colors, as shown by diagram 306 in FIG. 3. Then, clusters that are likely to represent a background may be selected in step 246. This selection may be based on clusters' spatial extent (if a cluster is connected to the eROI boundary, for example) and/or clusters' dimension, texture, or shape relative to the foreground object's characteristics. Furthermore, if available, a depth map may be used to distinguish between foreground and background regions. To this end, feedback information about the foreground objects' characteristic (teams' uniform color in the case of players tracking, for example) may also be used. Second, using the pattern signature of the selected background clusters in step 246, the eROI region may be clustered again in step 248 and diagram 308, this time resulting in a less fragmented and more accurate background clustering. Note that steps 246 and 248 may be repeated. Next, a binary mask indicating the object's foreground may be generated in step 250 based on the resulted collection of background clusters.

Detection of the foreground regions, steps 242 through 252, may be carried out for all the tracked objects in the current frame. In a case where foreground objects are similar (players of one team), these foreground regions may be modeled together 254 by processing the pixels of the combined foreground regions based on, for instance, color. Aforementioned, this foreground model may be used as feedback to the background cluster selection step 246 for future processing.

Figure 4:
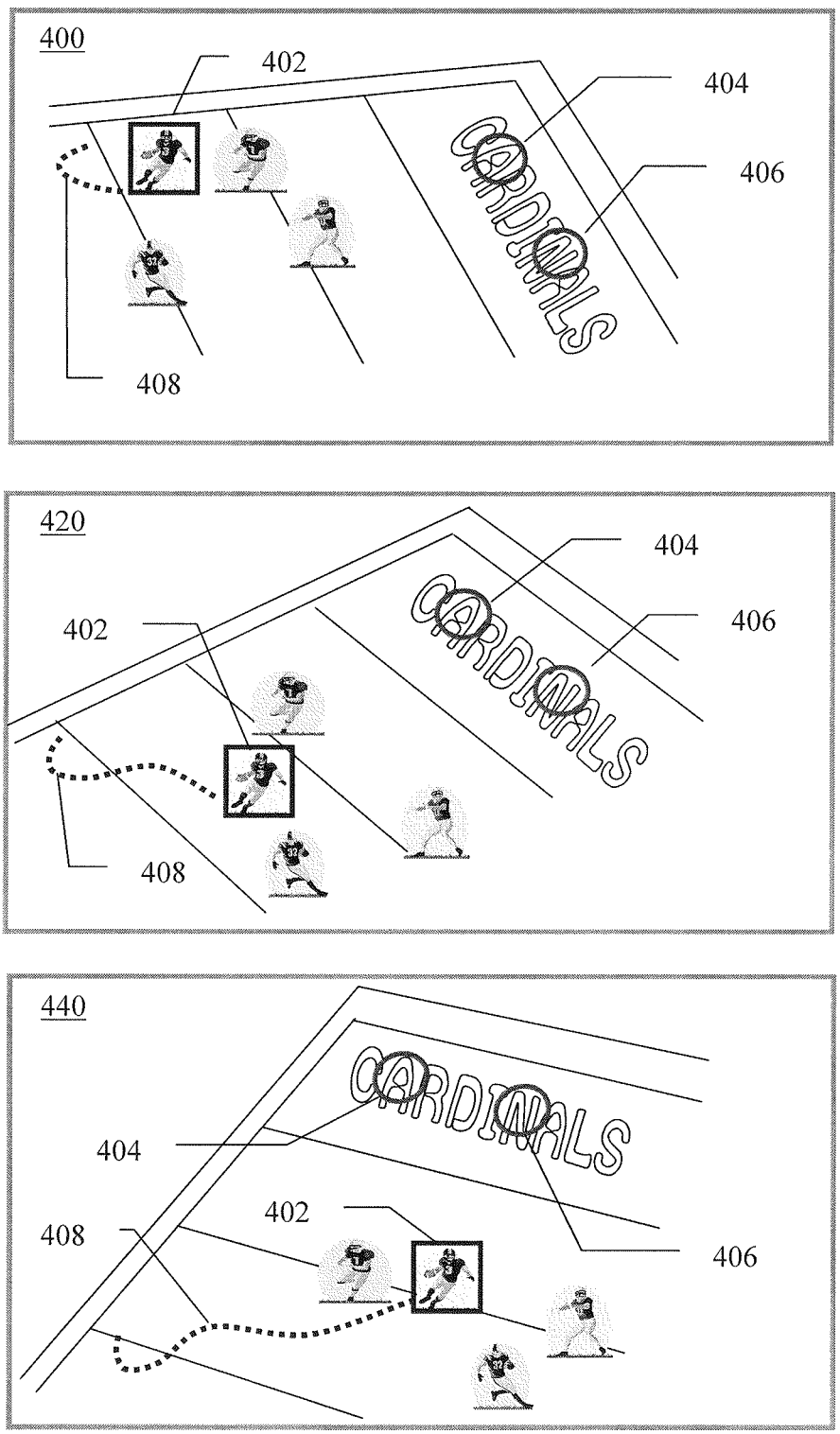
FIG. 4 illustrates trailing a wide receiver in a football game, according to an embodiment.

FIG. 4 demonstrates trailing of a moving object 126, according to an embodiment. As mentioned above, a trail is an array of points indicative of an object's position on the court or field through time. Since a trail's points may be computed in image-space (2D pixel coordinates or coordinates in an alternate 2D representation) as the camera's pose changes, these points' historical locations should be updated. According to a further embodiment, a trail of a moving object may be updated based on at least two stationary objects/patterns in the field of view.

For example, the top, middle, and bottom images in FIG. 4 show the first frame 400, middle frame 420, and last frame 440, respectively, in a football video sequence. As is apparent, the broadcast camera follows the Wide Receiver (WR) denoted by a box 402 through coverage by defensive players. In addition, two reference (stationary) patterns 404 and 406 are denoted by circles. Both the two reference patterns, 404 and 406, and the moving object 402 may be tracked continually by system 110. The wide receiver's trail 408 is updated as annotated in images 420 and 440.

Figure 5:
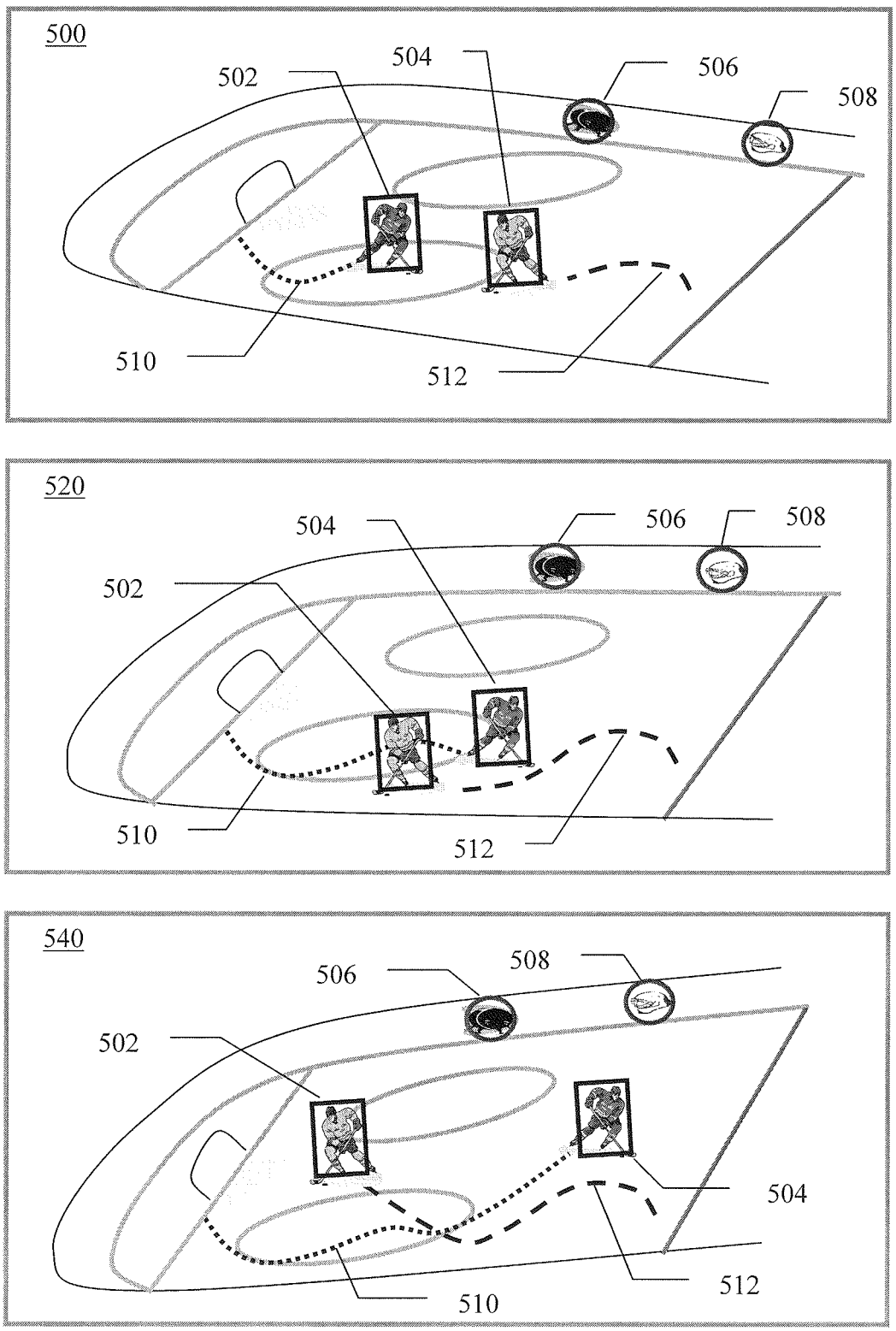
FIG. 5 illustrates trailing two hockey players, according to an embodiment.

Similarly, FIG. 5 demonstrates an embodiment that tracks and updates the trails of two hockey players, 502 and 504, based on two reference patterns, 506 and 508, located on the side board of a hockey rink in image 500. The trail 510 of player 504 and the trail 512 of player 502 are annotated. Trails 510 and 512 may be updated to compensate for camera motion and according to the players' progress on the ice as shown in later images 520 and 540.

Figure 6:
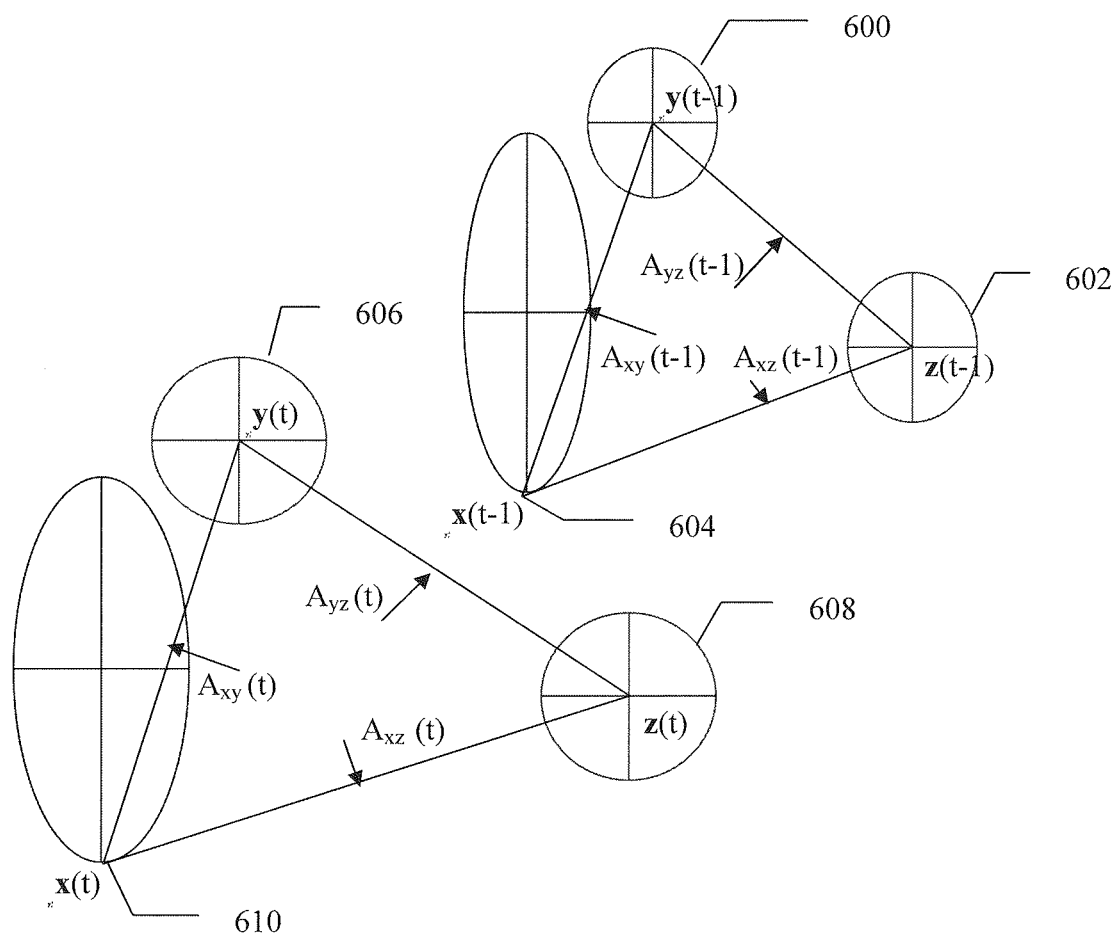
FIG. 6 illustrates a method for updating a trail, according to an embodiment.

FIG. 6 illustrates a way each trail point may be updated, according to an embodiment. The location on the floor of a moving object—a trail point 604—at time t−1: x(t−1) is given. In addition, the locations of two stationary reference patterns, 606 and 608, at time t: y(t) and z(t), and the locations of these same reference patterns, 600 and 602, at time t−1: y(t−1) and z(t−1) are given. Hence, the updated location of the trail point, 610, at time t: x(t) may be computed as follows. Assuming the spatial relation between {x(t), y(t), z(t)} and {x(t−1), y(t−1), z(t−1)} may be approximated by the similarity-transformation, the following ratios are preserved:

$$\frac{Ayz(t)}{Axy(t)} = \frac{Ayz(t-1)}{Axy(t-1)} \text{ and } \frac{Ayz(t)}{Axz(t)} = \frac{Ayz(t-1)}{Axz(t-1)} \quad (1)$$

where, for example, Ayz(t) is the distance between points y and z at time t. Based on the above relationship, the distances Axz(t) and Axy(t) may be computed based on the known distances: Ayz(t), Ayz(t−1), Axz(t−1), Axy(t−1). As long as the pair of the three non-collinear points—x(t), y(t), z(t) and x(t−1), y(t−1), z(t−1)—is approximately positioned on a plane, the computation in (1) is valid. Next, given the two points, z(t) and y(t) and their distances to x(t): Axz(t) and Axy(t), the trail point x(t) may be computed using Bi-Lateralization.

Figure 7:
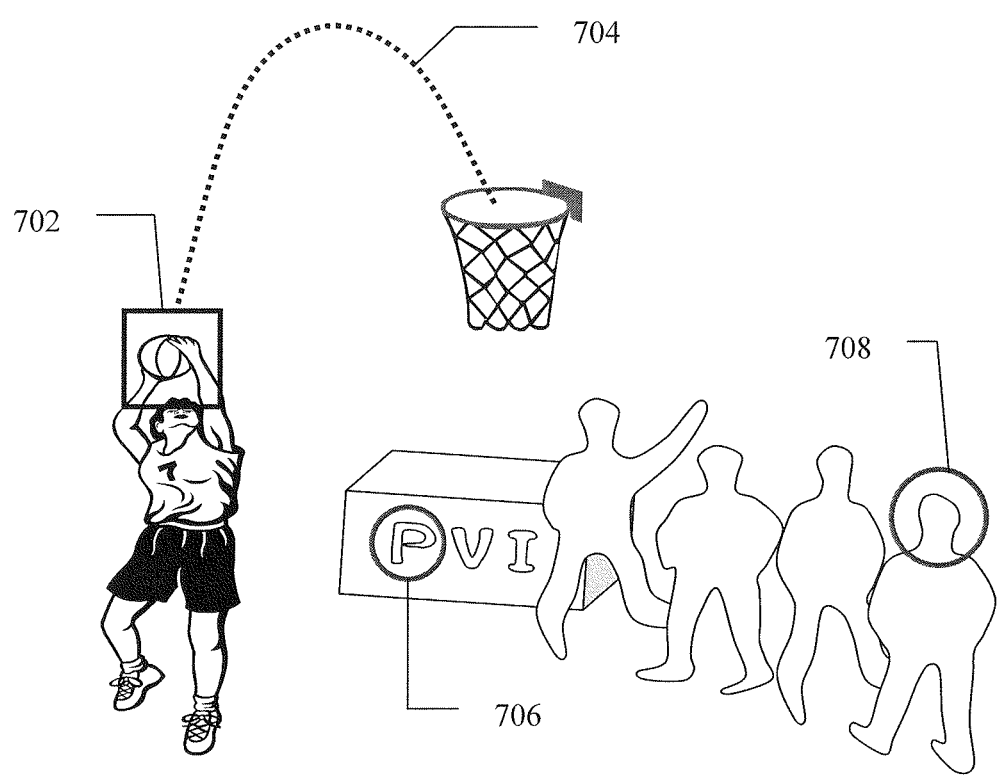
FIG. 7 illustrates trailing the ball in a basketball game based on side reference patterns, according to an embodiment.
Figure 8:
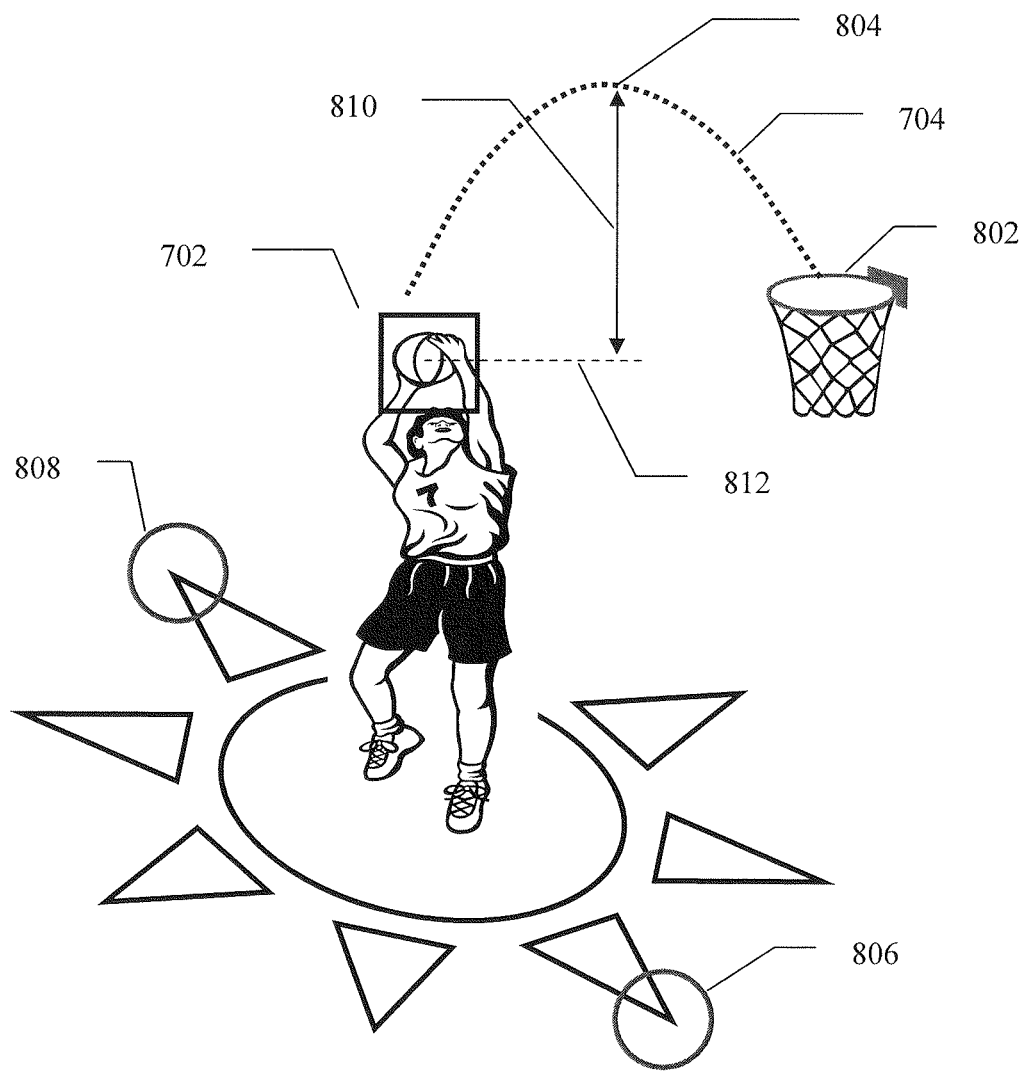
FIG. 8 illustrates trailing the ball in a basketball game based on floor reference patterns and determining the apex of the ball from the trail, according to an embodiment.

This method for updating an object's trail allows annotation relative to the progression of objects of interest without knowledge of the camera model or the scene background model. FIGS. 7 and 8 show an example where the moving object is the ball 702 in a basketball game and where annotation may be placed relative to the shot's trail 704. Here, a reference pattern may be part of the logo on the floor, 806 and 808 of FIG. 8, or even any temporary or approximately stationary pattern such as part of a logo 706 from an electronic billboard or part of the audience 708.

According to a further embodiment, the approach explained above may be extended to include more than two reference patterns (objects). Additional patterns distributed around the view may be used to stabilize the results for trail update. In one embodiment, a systematic method may be applied to acquire new reference patterns as established patterns are moving out of view. In another embodiment, multiple reference patterns may be employed, but the use of certain reference patterns may be suppressed if for example their associated motion is inconsistent with the majority of the reference patterns.

A variety of performance criteria or measures may be determined from the video sequence for both athletes and the scoring object: player velocity, player acceleration, force of impact, distance covered, player endurance, space created, shot speed, shot height, etc. Exemplary measures that may be used for various sports are detailed in U.S. patent application Ser. No. 12/490,026, which is incorporated by reference. Some of these measures may be derived from the path of the object in conjunction with a model that maps between the camera field of view and real world coordinates. For example, one method for generating statistics by object tracking in fixed and moving cameras is detailed in U.S. patent application Ser. No. 12/403,857, which is incorporated by reference. In some cases, it may be difficult to determine a complete field of view model for a camera. This may be true for broadcast footage comprised of one or more cameras zoomed in to cover the action of play. There are a number of statistical measures such as speed and relative distance, which can be computed without knowing the absolute position of objects in a scene or the exact pan, tilt and image distance of the camera observing the objects. Embodiments of the present invention may provide for computing real world statistics by determining an approximate camera magnification using known physical attributes of objects (players, equipment, ball, or hockey puck). The effective magnification may be found by relating the size of the objects in physical dimensions and the resulting image of the object on the sensor of the camera.

The size of an object in a video sequence may be determined according to an embodiment using system 110 shown in FIG. 1. Foreground detector 122 may obtain a current metric for the ROI of a player object in a video sequence. The ROI of a player in a given frame may be denoted as rectangle that may follow tightly the outline of the player, such as in diagram 304 of FIG. 3. The detected size for an object in a given frame of the video sequence may depend on the ROI for the frame. Alternately, it may depend on the one or more metrics for the detected foreground region, which may include but are not limited to: region width, region height, region length, length of region outline, area of region, total pixels detected in the foreground region, etc. Foreground detector 122 may determine the size of one or more objects in one or more images of the video sequence. Furthermore, Foreground detector 122 may determine the size of the distance between two reference objects in one or more images of the video sequence. Foreground detector 122 may be also be configured to be a size detector. Size and or distance may be measured in a number of 2D coordinate spaces including, but not limited to, a measurement in image space, a measurement on the sensor of a camera, a measurement on a virtual surface relative to the camera, or an angular measurement.

The magnification for an image in a video sequence may be computed according to an embodiment. Object tracker 124 may update over time the size and position of ROI determined by foreground detector 122 or determined by a size detector. The magnification corresponding to a particular image may be determined from the size ROI for the object and the known dimensions associated with the object itself. In this manner, object tracker 124 may determine the effective magnification of a camera for one or more images based on the size of one or more objects in the images. Also, object tracker 124 may determine the camera magnification based on the image distance (or alternate distance representation for the field of view of the camera) between two reference objects in the images of a video sequence. Furthermore, object tracker 124 may determine the magnification of images based on a span of activity of objects in the video sequence. Object tracker 124 may be configured to be a magnification detector. Size detector and magnification detector may also be represented by elements 122 and 124 and may be part of the Tracking System 140. In some embodiments, size detector 122 and magnification detector 124 may be used at least in part to determine a center of activity o or a span of activity. Determining a center or span of activity may be useful for controlling the field of view of one or more robotic cameras.

Statistical measures may be derived from the trail of an object according to an embodiment. Trail updater 126 may determine measurements while updating the trail for an object. It may be based on the current magnification of the camera determined by object tracker 124 or determined by a magnification detector. Alternately, these measurements may be dependent on a spatial span of activity in the case of multiple objects of interest. Furthermore, these measurements may be determined in conjunction with the position of one or more reference objects in the video sequence. Trail updater 126 may be configured to be a measurement detector. The statistical data or measures may be outputted for current use by trail updater 126, or stored by trail updater 126 for future retrieval. The current or future statistical information may be output to video annotator 128, which may add annotation elements 130 based on the statistical information derived from the trail. This may include diagrammatic elements representative of the statistical information that may include text. For example, the speed of a hockey skater may be annotated to the video image of the hockey skater.

FIG. 8 demonstrates measuring the height of a ball on a shot from a moving video sequence, according to an embodiment. The height of the basketball rim is 10 feet above the playing surface and the size of the ball 702 is typically 0.78 feet in diameter (29.5 inches in circumference). Suppose the rim 802 is detected as a reference object and both the sensor position and the sensor size of the ball may be determined for the apex image corresponding to the apex 804 of the shot in the video sequence. The size of a ball in an image may be determined using a size detector. The effective camera magnification for ball 702 at apex 804 is found, m=sqrt (0.78*0.78/sensor area of ball). The magnification on the image may be determined using a magnification detector. The sensor level of rim 802 may be found in video view by matching the point in the downward ball trajectory when reaching the rim to the corresponding point on the upward ball trajectory symmetrical to the apex. The distance 812 corresponding to the sensor displacement 810 relative to sensor level 806 may be found by multiplying the sensor displacement by the magnification. The physical height to the apex 804 may be computed relative to the rim (10 feet) as follows, ball height=10 feet+m*sensor displacement 810. The physical height may be determined using a measurement detector. Video annotator 128 may annotate the position of the apex 804 of a shot in a video sequence using annotation elements 130. Alternately, video annotator 128 may annotate the video sequence using a text graphic containing the numerical values of the height associated with the apex 804 of the shot. The text graphic may overlay the video as a burn-in or may appear to be integrated to the scene of the video sequence. In some embodiments, video annotator may employ a combination of annotations elements 130 and text graphics overlaying or integrated into the video sequence.

Figure 9:
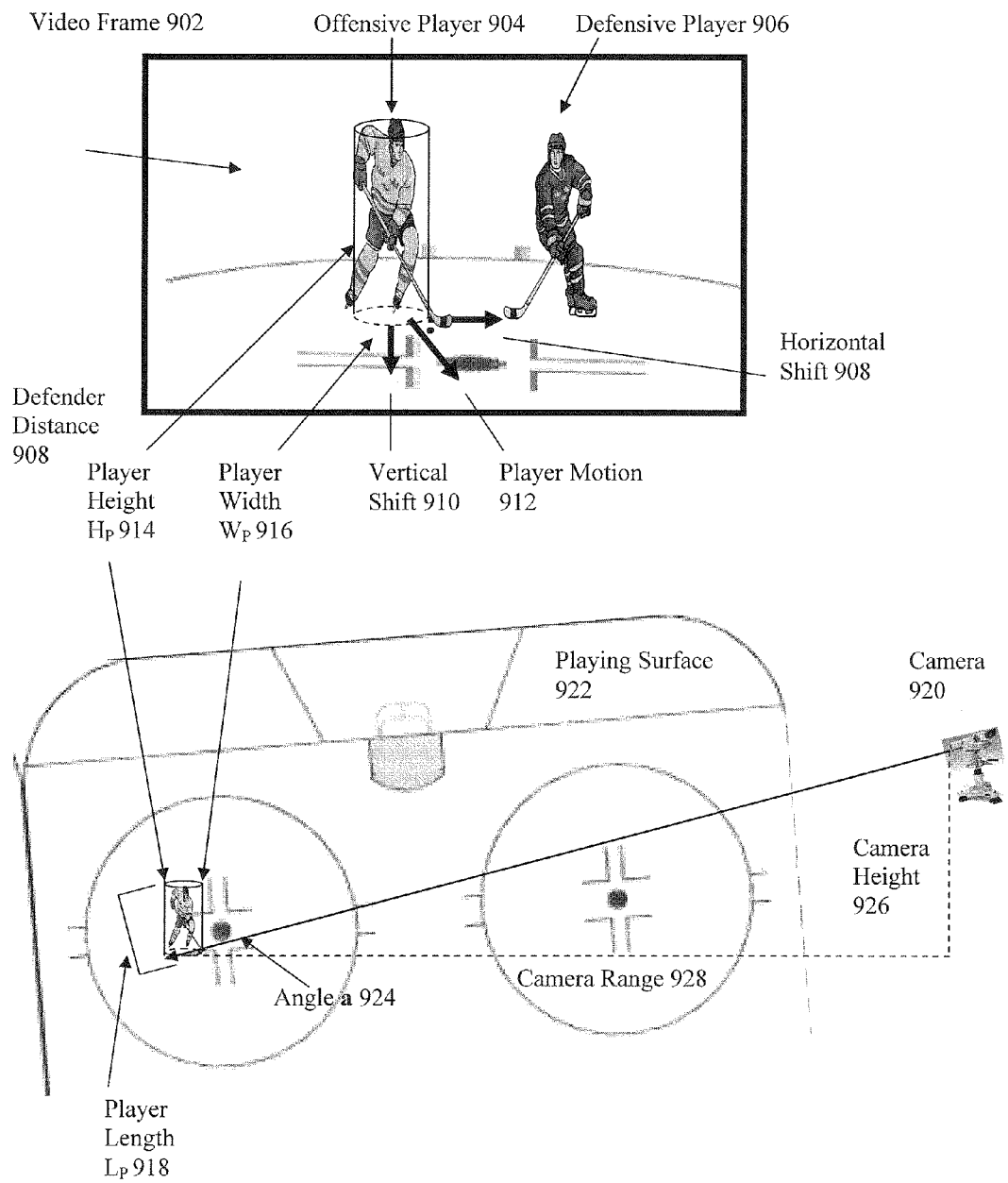
FIG. 9 illustrates computing measurements using object dimensional information, according to an embodiment.

FIG. 9 illustrates another example for deriving player measures from a video sequence based on displacement along the playing surface. The video frame 902 contains an offensive player 904 with the puck and defensive player 906 covering the offensive player. In some embodiments, defensive player 906 may be a reference object used to update the position of offensive player 904. Two measures that may be determined from the frame may be the horizontal coverage distance 908 separating the defense and offense players, and offensive player velocity 912. A difficulty here may be that the effective magnification for the horizontal displacement 908 and vertical displacement 910 along the playing surface may be different since the playing surface is not perpendicular to the camera view. The offensive player 904 may be modeled using a cylinder with a fixed height $H_P$ 914 and fixed diameter width $W_P$ 916. For cases where a player is approximately on an optical axis of the camera 920, the angle 924 between the ground plane and the optical axis, a=$\tan^{-1}$ (camera height 926/camera range 928). The angle a 924 may be used to find the approximate length 918 of the player perpendicular to the optical axis, $L_P$=cos(a) $H_P$+sin (a)$W_P$. The angle a 924 has a fixed range bounded by the near side (center point) or far side (far corner) of the playing surface, and may be approximated based on the approximate location of the player relative to the boundaries of the playing surface.

The size or dimension or dimensions of a player in an image may be determined using a size detector. Given the measured length and width of the image of the player on the sensor is $L_{PS}$ and $W_{PS}$ in FIG. 9, the effective magnification perpendicular to the optical axis (horizontally on the playing surface) is m≈$W_P/W_{PS}$≈$L_P/L_{PS}$≈sqrt (($W_P$ $L_P$)/($W_{PS}$ $L_{PS}$)) ≈sqrt (($W_P$ $L_P$)/(player area on sensor)), where as "sqrt" denotes the square-root operator. The effective magnification for vertical shifts along the playing surface 922 may be approximated by $m_v$=m/sin(a). The magnification may be determined using a magnification detector. Horizontal and vertical displacement shifts on the camera sensor may be related to physical displacement along the playing using the magnifications m and $m_v$. Measurements may be determined based on the horizontal and vertical magnifications using a measurement detector. There are alternate reference measurements that may relate sensor displacement with physical displacement: player boundary, stick length, uniform number size, jersey size, leg width and length, arm with and length, torso size, head size, etc. The markings on the playing surface are useful means for relating reference measurements to image displacement. The marking may be easily detected and measured in a video sequence, and the distance between markings may have known fixed real-world dimensions for a given sport. Also, the angle a 924 may be iteratively found from the effective camera magnification, by substituting $L_{PS}$, $W_{PS}$, and $L_P$=cos(a) $H_P$+sin (a)$W_P$ into m $W_P/W_{PS}$≈$L_P/L_{PS}$. The angle may be determined by the magnification detector or the measurement detector.

There is a range of applications for measuring the position of objects relative to fixed or moving (other objects) reference points or reference objects. In one embodiment, the proximity of the scoring object (ball or puck) is found in relation to a line (goal line or out of bounds line). In this case, the reference object may be a boundary object. The measurement may be utilized by broadcasters to assess referee decisions on particular plays. In another embodiment, the position of the scoring object is found relative to a player to determine the moment the ball is released (kick or throw) or caught. This may be used to compute the hang time of a punt in American football, which may be measured as the time the ball is kicked to the time it is caught. In yet another embodiment, the impact of a collision between two players in hockey or football may be estimated in part using the instantaneous velocity and pose prior to the collision.

Additional measures based on the sequence of actions in sporting events are detailed in U.S. patent application Ser. No. 12/834,069, which is incorporated by reference.

Figure 10:
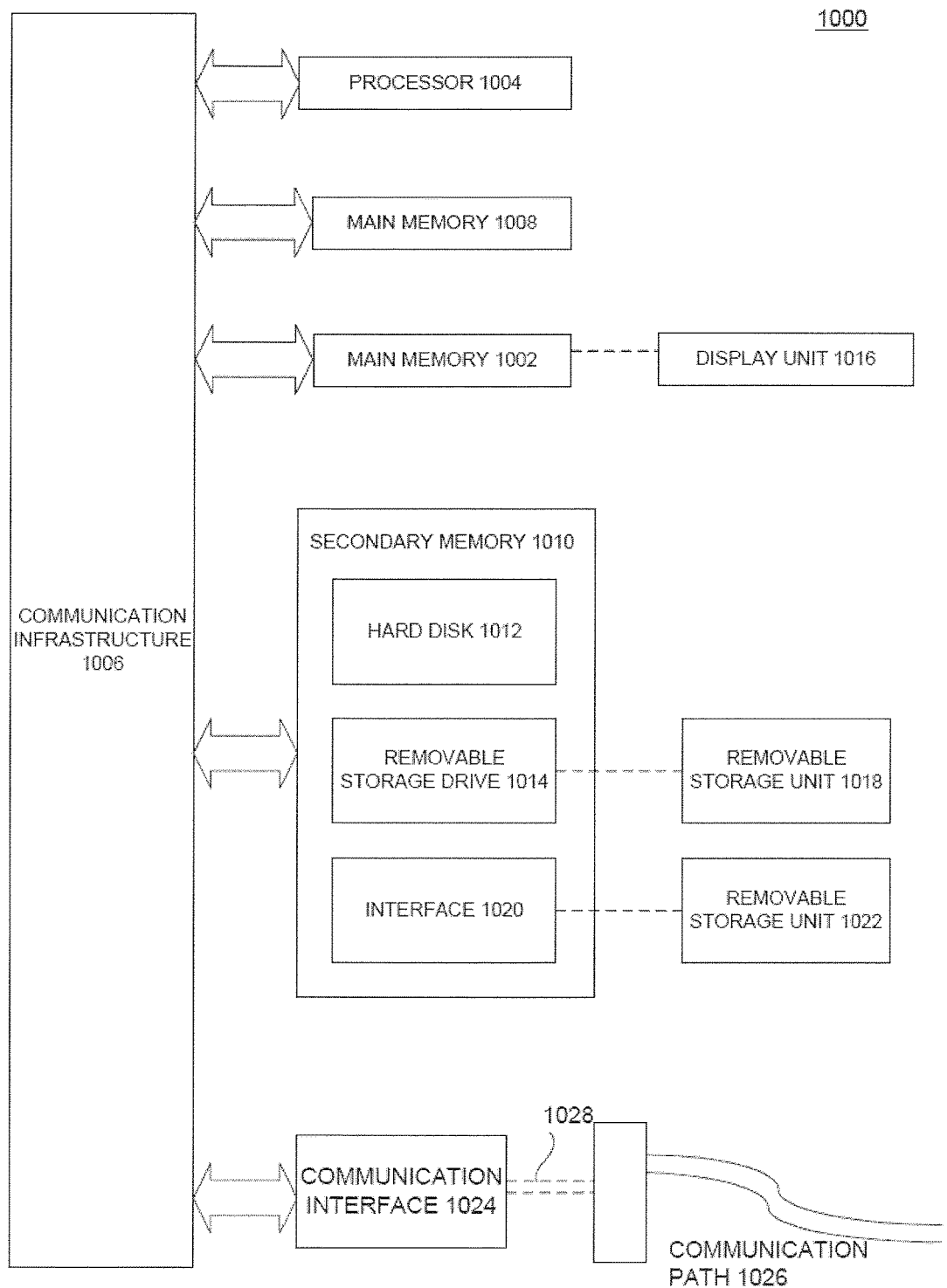
FIG. 10 illustrates an example computing device which may be used in embodiments of this invention.

Aspects described above, for the exemplary embodiments shown in FIGS. 1-9 or any part(s) or function(s) thereof may be implemented using hardware, software modules, firmware, tangible computer readable or computer usable storage media having instructions stored thereon, or a combination thereof and may be implemented in one or more computer systems or other processing systems. FIG. 10 illustrates an example computer system 1000 in which embodiments of the present invention, or portions thereof, can be implemented as computer-readable code. For example, tracking system 140 and object characterizer 114, including object locator 118, object modeler 120, foreground detector 122, object tracker 124, as well as trail updater 126, video annotator 128, camera controller 134 and/or any other components of the exemplary systems shown in FIGS. 1-9 can be implemented in hardware, firmware, or as computer-readable code on a computer system such as computer system 1000. After reading this description, it will become apparent to a person skilled in the relevant art how to implement the invention using other computer systems and/or computer architectures.

Computer system 1000 includes one or more processors, such as processor 1004. Processor 1004 can be a special purpose or a general purpose processor. Processor 1004 is connected to a communication infrastructure 1006 (for example, a bus or network).

Computer system 1000 also includes a main memory 1008, preferably random access memory (RAM), and may also include a secondary memory 1010. Secondary memory 1010 may include, for example, a hard disk drive 1012 and/or a removable storage drive 1014. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art(s), removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, a wireless card, or the like. Software and data transferred via communications interface 1024 are in the form of signals which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1022, a hard disk installed in hard disk drive 1012, and signals carried over communications path 1126. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor 1004 to implement the processes of the present invention, such as the steps in the methods described above. Accordingly, such computer programs represent controllers of the computer system 1000. Where the invention is implemented using software, the software may be stored in a computer program product and loaded into computer system 1000 using removable storage drive 1014, interface 1020, hard drive 1012 or communications interface 1024.

Embodiments of the invention also may be directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for analyzing a video sequence from a moveable camera imaging an event, comprising:
   a tracking system tracking past positions of a tracked object in the video sequence and tracking positions of two or more stationary reference objects in the video sequence;
   a trail updater updating a trail, wherein the trail comprises the past positions of the tracked object, further wherein the updating is based on the positions of the two or more reference objects in the video sequence relative to the past positions of the tracked object in the video sequence; and
   a camera controller controlling a field of view of the moveable camera based on the trail of the tracked object, wherein controlling comprises at least one of steering the entire moveable camera or adjusting a position of the entire moveable camera.

2. The system of claim 1, wherein the trail updater is further configured to use different subsets of tracked objects as the two or more reference objects.

3. The system of claim 1, wherein the trail updater is further configured to use a stationary pattern as the two or more reference objects.

4. The system of claim 1, wherein the tracking system comprises an object characterizer configured to construct a model of the tracked object in the video sequence.

5. The system of claim 4, wherein the tracking system is further configured to extract the model of the tracked object from a database of pre-defined object models and use the model of the tracked object to automatically determine an initial location of the tracked object.

6. The system of claim 4, wherein the tracking system is further configured to receive an initial location of the tracked object and automatically construct the model of the tracked object based on the initial location of the tracked object.

7. The system of claim 4, wherein the tracking system further comprises a foreground detector configured to determine one or more foreground descriptors for one or more foregrounds in the video sequence.

8. The system of claim 7, wherein the foreground detector is further configured to perform intra-frame foreground detection within a local region surrounding the tracked object.

9. The system of claim 7, wherein the foreground detector is further configured to determine the one or more foreground descriptors based on a plurality of features.

10. The system of claim 7, wherein the tracking system further comprises an object tracker configured to determine a position of the tracked object in the video sequence based on the model of the tracked object and the one or more foreground descriptors without use of parameters of the camera.

11. The system of claim 1, further comprising a video annotator configured to annotate the trail of the tracked object in a field of view of the camera.

12. The system of claim 1, wherein the camera directs the moveable camera to at least one center of activity based on location information of objects in a scene.

13. The system of claim 1, wherein the tracking system further comprises a size detector configured to determine the size of the tracked object in an image of the video sequence.

14. The system of claim 1, wherein the tracking system further comprises a magnification detector configured to determine a magnification of one or more images in the video sequence.

15. The system of claim 1, wherein the tracking system further comprises a measurement detector configured to determine a measurement of the tracked object based in part on the trail of the tracked object.

16. The system of claim 15, wherein the measurement detector is further configured to determine a measurement of the tracked object based in part on a magnification of an image in the video sequence.

17. The system of claim 15, wherein the measurement detector is further configured to determine the measurement of the tracked object based in part on the trail of the tracked object in relationship to the respective positions of one or more reference objects in the video sequence.

18. The system of claim 15, further comprising a video annotator configured to annotate the video sequence based on the measurement of the tracked object.

19. A method for analyzing a video sequence from a movable camera imaging an event, comprising:
   tracking past positions of a tracked object in the video sequence;
   tracking positions of two or more stationary reference objects in the video sequence;
   updating a trail, wherein the trail comprises the past positions of the tracked object, further wherein the updating is based on the positions of the two or more reference objects in the video sequence relative to the past positions of the tracked object in the video sequence; and
   controlling a field of view of the moveable camera based on the trail of the tracked object, with a camera controller, wherein controlling comprises at least one of steering the entire moveable camera or adjusting a position of the entire moveable camera.

20. The method of claim 19, wherein updating includes using different subsets of tracked objects as the two or more reference objects.

21. The method of claim 19, wherein updating includes using a stationary pattern as the two or more reference objects.

22. The method of claim 19, wherein tracking the trail includes constructing a model of the tracked object in the video sequence.

23. The method of claim 22, wherein constructing includes extracting the model of the tracked object from a database of pre-defined object models and using the model of the tracked object to automatically determine an initial location of the tracked object.

24. The method of claim 22, wherein constructing includes receiving an initial location of the tracked object and automatically constructing the model of the tracked object based on the initial location of the tracked object.

25. The method of claim 19, wherein tracking the trail includes determining one or more foreground descriptors for one or more foregrounds in the video sequence.

26. The method of claim 25, wherein determining one or more foreground descriptors includes performing intra-frame foreground detection within a local region surrounding the tracked object.

27. The method of claim 25, wherein determining one or more foreground descriptors includes determining the one or more foreground descriptors based on a plurality of features.

28. The method of claim 25, wherein tracking the trail includes determining a position of the tracked object in the video sequence based on the model of the tracked object and the one or more foreground descriptors without use of parameters of the camera.

29. The method of claim 19, further comprising annotating the trail of the tracked object in a field of view of the camera.

30. The method of claim 19, wherein controlling includes directing the moveable camera to at least one center of activity based on location information of objects in a scene.

31. The method of claim 19, wherein controlling includes controlling a zoom level of the moveable camera based on the trail of the tracked object.

32. The method of claim 19, wherein tracking the trail includes determining a size of the tracked object in an image of the video sequence.

33. The method of claim 19, wherein tracking the trail includes determining a magnification of one or more images in the video sequence.

34. The method of claim 33, wherein determining a magnification includes determining effective magnifications for the tracked object corresponding to a tracked and a second direction within a plane.

35. The method of claim 33, wherein determining a measurement includes determining a measurement of the tracked object based in part on a magnification of an image in the video sequence.

36. The method of claim 19, further comprising determining a measurement of the tracked object based in part on the trail of the tracked object.

37. The method of claim 36, wherein determining a measurement includes determining the measurement of the tracked object based in part on the trail of the tracked object in relationship to the respective positions of one or more reference objects in the video sequence.

38. The method of claim 37, further comprising annotating the video sequence based on the measurement of the tracked object.

* * * * *